(12) United States Patent
Braun et al.

(10) Patent No.: US 6,179,908 B1
(45) Date of Patent: Jan. 30, 2001

(54) IRON OXIDE RED PIGMENTS, PROCESS FOR THE PRODUCTION OF IRON OXIDE RED PIGMENTS AND USE THEREOF

(75) Inventors: Rolf-Michael Braun; Eckhard Bayer; Ulrich Meisen, all of Krefeld (DE)

(73) Assignee: Bayer AG, Leverkusen (DE)

(*) Notice: Under 35 U.S.C. 154(b), the term of this patent shall be extended for 0 days.

(21) Appl. No.: 09/173,374

(22) Filed: Oct. 15, 1998

(30) Foreign Application Priority Data

Oct. 20, 1997 (DE) ................................ 197 46 262

(51) Int. Cl.[7] ................. C01G 49/02; C01G 49/06; C09C 1/24; C09D 17/00
(52) U.S. Cl. .................. 106/456; 106/459; 423/633
(58) Field of Search ................... 106/456, 459, 106/460; 423/633, 632

(56) References Cited

U.S. PATENT DOCUMENTS

| 3,946,103 | * | 3/1976 | Hund | 106/456 |
| 4,256,723 | * | 3/1981 | Urban, Jr. | 106/456 |
| 4,382,822 | | 5/1983 | Mayer. | |
| 4,702,776 | * | 10/1987 | Hoffner et al. | 106/456 |
| 4,911,760 | * | 3/1990 | Burow et al. | 106/456 |
| 5,421,878 | * | 6/1995 | Lerch et al. | 106/456 |
| 5,614,012 | * | 3/1997 | Pitzer | 106/456 |

FOREIGN PATENT DOCUMENTS

| 0 691 307 | 1/1996 | (EP). |
| 85265 | 10/1985 | (LU). |

OTHER PUBLICATIONS

*Ullmann's Encyclopedia of Industrial Chemistry,* Photography of Plastics, Processing, Fifth Complete Revised Edition, vol. A 20, pp. 297–304 (no date).
CA 113:44190, vol. 113, No. 6, Aug. 6, 1990.
EP 98118977 Search Report (no date).

* cited by examiner

*Primary Examiner*—Michael Marcheschi
(74) *Attorney, Agent, or Firm*—Connelly Dave Lodge & Hutz LLP

(57) ABSTRACT

The present invention relates to iron oxide red pigments, a process for the production of iron oxide red pigments by calcining iron oxide yellow pigments or iron oxide black pigments, and the use thereof.

24 Claims, No Drawings

IRON OXIDE RED PIGMENTS, PROCESS FOR THE PRODUCTION OF IRON OXIDE RED PIGMENTS AND USE THEREOF

The present invention relates to iron oxide red pigments, a process for the production of iron oxide red pigments by calcining iron oxide yellow pigments or iron oxide black pigments, and the use thereof.

Precipitation processes for the production of iron oxides have been known for a long time. The typical course of these processes is described, for example, in Ullmanns Enzyklopädie der technischen Chemie, 5th edition, volume A 20, pages 297 ff. Iron(II) sulfate formed during the pickling of steel plates or iron(II) sulfate formed during the production of titanium dioxide by the sulfate process is usually used as the raw material.

An increased trend towards using hydrochloric acid as pickle has been observed for years in the pickling industry, and so large quantities of $FeCl_2$ are formed. Furthermore, the so-called chloride process is increasingly being used worldwide to produce titanium dioxide. Large quantities of $FeCl_2$ are formed during the production of synthetic rutile for $TiO_2$ production. Solutions containing iron(II) chloride, which should as far as possible be converted into useful substances, are thus increasingly being formed from these processes.

One common process for utilising $FeCl_2$ waste solutions is the spray roasting process, in which iron(II) chloride or iron(III) chloride is subjected to oxidative hydrolysis at high temperatures (typically at more than 1000° C.). Iron oxides, typically haematite, and hydrochloric acid, which can also be recycled as a useful substance, e.g. back into the pickling process, are the end products of this process. An iron oxide which is generally suitable for producing hard ferrites is obtained from this process without any special purification steps. If soft ferrites are to be produced from iron oxides obtained in this way, the iron chloride solution used has to undergo additional purification operations beforehand, which makes the process considerably more expensive. Since more and more iron chloride, largely of inferior quality, is being produced and the take-up capacity of the ferrite market is limited, an alternative method of producing a useful substance from these iron chlorides is being sought. Direct landfill or discharge at sea of the iron chloride solutions is not possible for ecological reasons.

The object of the present invention was therefore to provide a process allowing iron chloride solutions to be converted cheaply and as simply as possible into high-quality useful substances.

It was possible to achieve this object through the iron oxide red pigments according to the invention and the process according to the invention.

The present invention provides iron oxide red pigments with a lightness L* (full shade) of 36.0 to 44.0 CIELAB units, an a* value of 24 to 30 CIELAB units and a b* value of 14 to 26 CIELAB units and with a lightness L* (with brightening) of 59 to 66 CIELAB units and an a* value of 18 to 30 CIELAB units and a b* value of 4 to 26 CIELAB units and with an Mn content of 0.012 to 0.12 wt. %, based on pigment, a chloride content of 0.05 to 0.59 wt. %, based on pigment, and a chromium content of less than 40 mg/kg pigment.

The invention also provides a process for the production of iron oxide red pigments by calcining iron oxide yellow pigments at temperatures of 350 to 1000° C., preferably of 600 to 900° C., in the presence of an oxygen-containing gas and optionally by subsequent grinding, characterised in that the iron oxide yellow pigment was produced as follows, in that a) an alkaline component is added to an acidic Fe(II) chloride solution with an $FeCl_2$ content of 50 to 450 g/l, stirring intensively, in a quantity sufficient to adjust the pH of the solution to between 3 and 5, b) a flocculation aid is optionally also added to the solution before or after adding the alkaline component or together with the alkaline component, c) oxidation is optionally carried out after adding the alkaline component and the optional flocculation aid, d) the solid formed after the treatment in a) to c) is separated from the solution, e) the solution formed in d) is added to an α- or β-FeOOH seed suspension produced by the precipitation process in a quantity corresponding to 4 to 8 times the molar quantity of iron in the seed suspension overall (i.e. iron from iron oxide hydroxide and iron from unreacted iron compound), f) the suspension formed in e) is heated to a temperature of 30 to 95° C., preferably of 30 to 85° C., particularly preferably of 55 to 75° C., mixing thoroughly, g) oxidation is then carried out using an oxidising agent, the oxidising agent being added such that 0.5 to 10 mole % iron per hour, preferably 0.5 to 2.0 mole % iron per hour, is oxidised and at the same time the pH is increased, using an alkaline component, at a rate of 0.01 to 0.4 pH units/hour to a final pH of 3.0 to 5.0, h) oxidation is optionally continued at a constant pH of between 3.0 and 5.0, i) oxidation is stopped as soon as the Fe(II) content of the suspension is less than 1 mole %, j) the solid from i) is finally separated off, washed, dried and ground.

The invention also provides a process for the production of iron oxide red pigments by calcining iron oxide black pigments at temperatures of 350 to 1000° C., preferably of 600 to 900° C., in the presence of an oxygen-containing gas and optionally by subsequent grinding, characterised in that the iron oxide black pigment was produced as follows, in that a) an alkaline component is added to an acidic Fe(II) chloride solution with an $FeCl_2$ content of 50 to 450 g/l, stirring intensively, in a quantity sufficient to adjust the pH of the solution to between 3 and 5, b) a flocculation aid is optionally also added to the solution before or after adding the alkaline component or together with the alkaline component, c) oxidation is optionally carried out after adding the alkaline component and the optional flocculation aid, d) the solid formed after the treatment in a) to c) is separated from the solution, e) the solution formed in d) is added to a solution which contains a precipitant reacting as an alkali, at a temperature of 50 to 95° C., in a quantity such that the equivalent ratio of iron(II) to precipitant is 0.5 to 0.65, preferably 0.5 to 0.58, f) oxidation is then carried out using an oxidising agent, g) oxidation is stopped as soon as the FE(II) content of the suspension obtained in f) is less than 1 mole %.

Sodium hydroxide, sodium carbonate, magnesium carbonate, magnesium oxide, magnesium hydroxide, calcium oxide, calcium hydroxide or ammonia is preferably used as the alkaline component or precipitant reacting as an alkali.

Iron(II) chloride solutions from steel pickling or else iron(II) chloride solutions from $TiO_2$ production by the chloride process may be used.

The iron oxide yellow pigments or iron oxide black pigments obtained as intermediates in the process according to the invention have manganese contents of 0.011 to 0.11 wt. %, based on pigment, and chloride contents of 0.07 to 0.7 wt. %, based on pigment, and chromium contents of 5 to 40 mg/kg, based on pigment.

When producing iron oxide red via iron oxide black in accordance with the invention, it is advantageous to maintain an equivalence ratio of iron(II) to precipitant of 0.5 to 0.65.

It is generally useful to grind after calcining. Grinding is preferably carried out with a jet mill, a pendulum roller mill, a roller mill, an attritor, with an impact mill or with a bead mill. Dry grinding with the addition of a grinding aid is particularly preferred.

The process according to the invention may advantageously be carried out as follows:

Sodium hydroxide solution is added to an iron(II) chloride solution with an $FeCl_2$ content of between 50 and 450 g/l, stirring intensively, in a quantity such that the pH is adjusted to 3 to 5. Another alkaline component, such as e.g. $Ca(OH)_2$, $Na_2CO_3$ or ammonia etc., may be used instead of the sodium hydroxide solution. In addition, the sedimentation properties of the hydroxide or carbonate slurry formed may be improved by adding a flocculation aid. Known flocculation aids, such as e.g. polyacrylates or other substances with similar action, may be used. Subsequent oxidation may optionally also take place to improve the precipitation properties. This can also have the effect that various metal cations are converted to oxides or oxyhydroxides of higher valence, which are more easily separated.

The hydroxide or carbonate slurry formed may be separated off by sedimentation, filtration or using a separator. The optimum selection of suitable apparatus or a suitable method depends on the precise test conditions, the flow rates and the raw materials used.

Production of Iron Oxide Yellow

The iron(II) chloride solution produced as above is added to an α- or β-FeOOH seed suspension produced by the precipitation process, in which the seeds preferably have a BET surface area of 50 to 70 $m^2/g$, in a quantity corresponding to 4 to 30 times the molar quantity of iron in the seed overall (i.e. iron oxide hydroxide and unreacted $FeCl_2$). The suspension obtained is preferably brought to a temperature of between 30 and 95° C., preferably between 30 and 85° C., particularly preferably between 55 and 75° C., with stirring. When this temperature has been reached, oxidation is carried out using an oxidising agent and, at the same time, the pH is increased at a rate of 0.01 to 0.4 pH units/hour to a final pH of 3.0 to 5.0. The rate of oxidation, which depends on the rate of addition of the oxidising agent, the temperature, the blending in the vessel and the pH, should preferably be between 0.5 and 10 mole % iron per hour, particularly preferably between 0.5 and 2.0 mole % iron per hour. If the rate of oxidation is significantly below the lower limit, the process becomes uneconomical; if the rate of oxidation is clearly above the upper limit, this leads to an uneven particle size.

The pigment suspension is worked up by the known steps of filtration, drying and grinding.

Modifiers which control the particle shape and particle size distribution may preferably also be added during pigment production. Aluminium, zinc and phosphate should be mentioned in particular. However, organic modifiers such as aliphatic amines, hydroxycarboxylic acids, aliphatic alcohols or carboxylic acids or their derivatives may also be used.

The following are examples of oxidising agents that may be used:

atmospheric oxygen pure oxygen ozone $H_2O_2$ sodium hypochlorite or bleach liquor or calcium hypochlorite chlorites or chlorates perchlorates nitrates chlorine The oxidation is preferably stopped as soon as the Fe(II) content of the suspension is less than 1 mole %. More extensive oxidation may be carried out until conversion is complete.

Apart from the use of iron(II) chloride solutions, mixtures of iron(II) chloride and iron(II) sulfate solutions may also be used both in seed production and in pigment production. The preferred embodiment, however, is the exclusive use of iron(II) chloride solutions. Iron(II) chlorides formed during $TiO_2$ production by the chloride process may also be used, for example, if they have previously been reduced to iron(II) chloride using metallic iron.

The suspension obtained, which contains the precipitated iron oxide yellow pigment, is filtered. The solid filtered off is calcined at temperatures of 350 to 1000° C., preferably of 600 to 900° C., in the presence of oxygen-containing gases and then optionally ground.

Production of Iron Oxide Black

The iron(II) chloride solution produced as above is added to a solution containing a precipitant reacting as an alkali, in a quantity such that the equivalent ratio of iron(II) to precipitant is 0.5 to 0.65, particularly preferably 0.5 to 0.58. If, for example, NaOH is used as precipitant, then between 50 and 65 mol $FeCl_2$ can be used per 100 mol NaOH. If $K_2CO_3$ is used as precipitant, between 100 and 130 mol $FeCl_2$ are used per 100 mol $K_2CO_3$. The calculated quantity of pretreated iron(II) chloride solution is therefore pumped into the alkaline component at a temperature of between 50 and 95° C., preferably 70 to 95° C. Oxidation is then carried out using an oxidising agent. The oxidising agents already listed for the production of iron oxide yellow described above may be used here. The oxidation is stopped as soon as the Fe(II) content of the suspension is less than 1 mole %. More extensive oxidation until conversion is complete is uneconomical, but it can certainly be carried out.

Here too, the iron(II) chloride solution may be partly replaced by iron(II) sulfate solution. The preferred embodiment, however, is the exclusive use of iron(II) chloride solution. It is also possible to use iron(III) chloride formed during $TiO_2$ production by the chloride process if this has previously been reduced to iron(II) chloride using metallic iron.

The iron oxide red pigment according to the invention is then produced by calcining the α-FeOOH or $Fe_3O_4$ produced by the processes described above. Calcination takes place at temperatures of between 350 and 1000° C., particularly preferably 600 to 900° C., in the presence of an oxygen-containing gas.

The process according to the invention does not have to be carried out using any specific type of furnace. Calcination may take place, for example, in a fluidised bed furnace, a chamber furnace or a rotary furnace. The corresponding residence times required should be adapted to the furnace used.

Following calcination, grinding is usually appropriate, particularly at temperatures of more than 600° C.

For economic reasons, dry grinding is preferably carried out, with the addition of a conventional grinding aid (e.g. amines, alcohols, polyacrylates). A broad range of mills may be used. Jet mills, impact mills, bead mills, pendulum roller mills, roller mills and attritors are particularly suitable for grinding the red pigments according to the invention.

The iron oxide red pigments according to the invention or the iron oxide red pigments produced according to the invention are used for colouring building materials, plastics, paper and paints, for the production of colorant preparations, for the production of colorants for the foodstuffs industry and as catalysts.

The parts and percentages quoted in the following examples refer to the weight, unless otherwise specified.

The shade is determined in accordance with the specification quoted below.

1. Preparation in an Alkyd Paint to Measure the Full Shade

| Weighed quantities of pigment: | | |
|---|---|---|
| Fe-red | (haematite) | 1.00 g |
| Fe-yellow | (goethite) | 0.80 g |
| Fe-black | (magnetite) | 1.00 g |

The pigment is prepared with a disk pigment dispersing machine (Muller) in a non-drying test binder. The test binder (paste) consists of two components.

Component 1

Component 1 is an allyd resin binder based on linseed oil and phthalic anhydride. It meets the specifications mentioned as requirements of a test binder for pigments in the standards DIN EN ISO 787-24 (October 1995), ISO 787-25:1993 and DIN 55983 (December 1983). The product ®SACOLYD L 640 (Krems Chemie), formerly ®ALKYDAL L 64 (Bayer AG), is used.

Component 2

Component 2 is a rheological additive which is added to the paste to achieve thixotropic behaviour. A powdered, modified, hydrogenated castor oil, ®LUVOTHIX HT (Lehmann & Voss & Co.) is used at a concentration of 5.0%.

The LUVOTHIX HT is dissolved in the SACOLYD L 640 at 75 to 95° C. The cooled, semi-solid mass is passed once through a three-roll mill, and the paste is thus completed.

A disk pigment dispersing machine (Muller) as described in DIN EN ISO 8780-5 (April 1995) is used, namely an ENGELSMANN JEL 25/53 Muller with an effective disk diameter of 24 cm. The speed of the lower disk is approx. 75 $min^{-1}$. By hanging a 2.5 kg weight on the load clamp the force between the disks is adjusted to approx. 0.5 kN. The above-mentioned quantity of pigment and 5.00 g of paste are dispersed in three steps of 25 rotations each in accordance with the process described in DIN EN ISO 8780-5 (April 1995) section 8.1.

The pigment-paste mixture is then brushed into a paste disk which has a function corresponding to that of the paste disk in DIN 55983 (December 1983). The knife belonging to the paste disk is drawn across the indentation in the disk filled with the pigment-paste mixture such that a smooth surface is formed. The knife is moved in one direction at a rate of approx. 3 to 7 cm/s. The smooth surface is measured within a few minutes.

2. Brightening (Colour Intensity)

The pigment is prepared in a non-drying test binder using a disk pigment dispersing machine (Muller). The test binder (paste) consists of two components.

Component 1

Component 1 is an alkyd resin binder based on linseed oil and phthalic anhydride. It meets the specifications mentioned as requirements of a test binder for pigments in the standards DIN EN ISO 787-24 (October 1995), ISO 787-25:1993 and DIN 55983 (December 1983). The product SACOLYD L 640 is used.

Component 2

Component 2 is a rheological additive which is added to the paste to achieve thixotropic behaviour. A powdered, modified, hydrogenated castor oil, LUVOTHIX HT is used at a concentration of 5.0%.

The LUVOTHIX HT is dissolved in the SACOLYD L 640 at 75 to 95° C. The cooled, semi-solid mass is passed once through a three-roll mill and the paste is thus completed.

A disk pigment dispersing machine (Muller) as described in DIN EN ISO 8780-5 (April 1995) is used, namely an ENGELSMANN JEL 25/53 Muller with an effective disk diameter of 24 cm. The speed of the lower disk is approx. 75 $min^{-1}$. By hanging a 2.5 kg weight on the load clamp the force between the disks is adjusted to approx. 0.5 kN.

A commercially available titanium dioxide pigment ®BAYERTITAN R-KB-2 (Bayer AG) is used as the brightening agent. R-KB-2 has a composition corresponding to type R 2 in ISO 591-1977. If another R 2 pigment is used instead of R-KB-2, different CIELAB coordinates may be obtained in the colorimetry.

0.400 g of pigment, 2.000 g of BAYERTITAN R-KB-2 and 3.00 g of paste are dispersed in five steps of 25 rotations each in accordance with the process described in DIN EN ISO 8780-5 (April 1995) section 8.1.

The pigment-paste mixture is then brushed into a paste disk which has a function corresponding to that of the paste disk in DIN 55983 (December 1983). The knife belonging to the paste disk is drawn across the indentation in the disk filled with the pigment-paste mixture such that a smooth surface is formed. The knife is moved in one direction at a rate of approx. 3 to 7 cm/s. The smooth surface is measured within a few minutes.

3. Colorimeter

A spectrophotometer ("colorimeter") is used with a measuring geometry of d/8 without a gloss trap. This measuring geometry is described in ISO 7724/2-1984 (E) subsection 4.1.1, in DIN 5033, part 7 (July 1983) subsection 3.2.4 and in DIN 53236 (January 1983) subsection 7.1.1.

A DATAFLASH 200 measuring instrument from Datacolor International is used.

The colorimeter is calibrated against a white, ceramic working standard, as described in ISO 7724/2-1984 (E) subsection 8.3. The reflection data of the working standard against an ideal matt white body are stored in the colorimeter so that, after calibration with the white working standard, all colour measurements are related to the ideal matt white body. The black point calibration is carried out with a black hollow body supplied by the colorimeter manufacturer.

4. Colorimetry

Any gloss trap present is switched off. The temperature of the colorimeter and test specimen is approx. 25° C.±5° C.

4.1 Measuring the Coat of Paint

The coat is placed on the colorimeter in such a way that the measuring aperture covers a middle area of the paint film. The coat must sit close and lie flat. The measuring aperture must be completely covered by the paint film. The measurement then takes place.

4.2 Measuring the Paste Disk

Colorimetry takes place immediately after brushing into the paste disk. The filled paste disk is placed on the calorimeter in such a way that the measuring aperture is completely filled in by the indentation in the disk over which paste has been brushed. The disk must sit close and lie flat. The measurement then takes place.

5. Calculation of the CIE Coordinates

The CIE 1976 (L*, a*, b*) coordinates (abbreviated as CIELAB) of a reflection spectrum are dependent on the constraints selected during measurement and evaluation. The data given for the wavelength range of 400 nm to 700 nm and the interval of 20 nm apply to the DataFlash 2000 calorimeters currently in use.

Only the L*, a* and b* coordinates are given. All other values are redundant.

The CIE coordinates L*, a* and b* of 1976 are calculated in accordance with the calculation instructions in ASTM E 308-1985, section 7, from the reflection spectrum measured. The weighting functions of standard illuminant C and of the 2° standard colorimetric observer of 1931 in ASTM E 308-1985, Table 5.6 are used. The wave-length range is between 400 nm and 700 nm. The wavelength interval is 20 nm. No gloss is deducted in the calculation. The L*, a* and b* results are rounded to whole numbers.

The CIE coordinates are named in DIN 5033 Part 3 (July 1992) Coordinates of L*a*b* colour space. In ISO 7724/3-1984 the abbreviation CIELAB colour space is introduced. The coordinates are non-dimensional.

6. Determination of the Chromium and Manganese Content

The chromium and manganese content is determined by ICP-MS. The limit of detection of this method of determination is 10 µg/kg.

7. Determination of the Chloride Content

The chloride content is determined by ion chromatography.

By appropriate variation of the production conditions given, the expert will be in a position to produce a broad range of iron oxide red pigments of various particle sizes and thus of various shades.

The pigment suspensions are worked up by the known steps of filtration, drying and grinding.

The invention is described below by way of an example, which should not be regarded as constituting any restrictions whatsoever.

EXAMPLES

Example 1

Production of Iron Oxide Yellow From Iron(II) Chloride 54.72 liters of a β-FeOOH seed (FeOOH content: 39.78 g/l; $FeCl_2$ content: 65.94 g/l) produced by the precipitation process at 34° C. from a used acid (mixture of $FeCl_2$, HCl in water, as formed during the pickling of steel plates) with an $FeCl_2$ content of 213.4 g/l and an HCl content of 10.3 g/l, and 113.61 l of the same used acid are placed in an agitated vessel with a stirrer, gas dispersion device and liquid metering devices. This solution is heated to 65° C. Once 65° C. has been reached, sodium hydroxide solution with a content of 300 g/l is pumped in at a rate of pH increase of 4 pH units per hour until a pH of 2.0 is reached. Sodium hydroxide solution with a concentration of 300 g/l is then pumped in at a rate of pH increase of 0.05 pH units per hour until a pH of 3.8 is reached. At the same time, 100 liters air per hour are passed through the reaction mixture until the end of the reaction. The pH is then kept constant with more sodium hydroxide solution at 300 g/l until the end of the reaction, which is determined by the precipitation of all the $FeCl_2$ and the neutralisation of all the HCl.

The end product obtained is filtered, washed, dried and deagglomerated. After deagglomeration it is immediately suitable for the production of red pigments by calcination.

This product has the following properties:

Mn content: 0.054%, based on pigment

Cl content: 0.45%, based on pigment

Cr content: 20 mg/kg, based on pigment.

Example 2

Production of Iron Oxide Black From Iron(II) Chloride 65.84 liters of sodium hydroxide solution with a content of 300 g/l NaOH are placed in an agitated vessel with a stirrer, gas dispersion device and liquid metering devices and heated to 90° C. 155 liters of a used acid with an $FeCl_2$ content of 213.4 g/l and an HCl content of 10.3 g/l are then pumped into this sodium hydroxide solution within 80 minutes. 1.7 $Nm^3$/h air are then passed through the reaction mixture. After 230 minutes the reaction is finished. The magnetite obtained is filtered, washed, dried and deagglomerated.

This product has the following properties:

Mn content: 0.056%, based on pigment

Cl content: 0.60%, based on pigment

Cr content: 35 mg/kg, based on pigment

Example 3

Calcination and Grinding of Iron Oxide Yellow Produced From $FeCl_2$ at 600° C.

100 g of an iron oxide yellow produced in accordance with Example 1 are heated to 600° C. over 141 minutes in a fused silica dish in a chamber furnace, passing through 600 l/h air, and then taken out of the furnace and cooled to ambient temperature.

The product obtained has the following properties:

Measurement of colour intensity (brightening with BAYERTITAN R-KB2)

Absolute values:

L* :60.1 CIELAB units a* :27.6 CIELAB units b* :24.0 CIELAB units

Measurement of full shade

Absolute values:

L* :41.4 CIELAB units a* :26.5 CIELAB units b* :22.4 CIELAB units

Mn content: 0.037%, based on pigment

Cl content: 0.20%, based on pigment

Cr content: 18 mg/kg, based on pigment

Example 4

Calcination and Grinding of Iron Oxide Yellow Produced From $FeCl_2$ at 700° C.

100 g of an iron oxide yellow produced in accordance with Example 1 are heated to 700° C. over 169 minutes in a fused silica dish in a chamber furnace, passing through 600 l/h air, and then taken out of the furnace and cooled to ambient temperature.

The product obtained had the following properties:

Measurement of colour intensity (brightening with BAYERTITAN R-KB2)

Absolute values:

L* :59.9 CIELAB units a* :27.9 CIELAB units b* :20.9 CIELAB units

Measurement of full shade

Absolute values:

L* :42.1 CIELAB units a* :29.1 CIELAB units
b* :23.5 CIELAB units
Mn content: 0.037%, based on pigment
Cl content: 0.17% based on pigment
Cr content: 17 mg/kg, based on pigment Example 5

Calcination and Grinding of Iron Oxide Yellow Produced From $FeCl_2$ at 900° C.

100 g of an iron oxide yellow produced in accordance with Example 1 are heated to 900° C. over 218 minutes in a fused silica dish in a chamber furnace, passing through 600 l/h air, and then taken out of the furnace and cooled to ambient temperature.

The product obtained had the following properties:
Measurement of colour intensity (brightening with BAYERTITAN R-KB2)
Absolute values:
L* :59.8 CIELAB units
a* :25.1 CIELAB units
b* :12.3 CIELAB units
Measurement of full shade
Absolute values:
L* :39.9 CIELAB units
a* :29.1 CIELAB units
b* :20.8 CIELAB units
Mn content: 0.037%, based on pigment
Cl content: 0.20%, based on pigment
Cr content: 17 mg/kg, based on pigment Example 6

Calcination and Grinding of Iron Oxide Yellow Produced From $FeCl_2$ at 1000° C.

100 g of an iron oxide yellow produced in accordance with Example 1 are heated to 1000° C. over 240 minutes in a fused silica dish in a chamber furnace, passing through 600 l/h air, and then taken out of the furnace and cooled to ambient temperature.

The product obtained had the following properties:
Measurement of colour intensity (brightening with BAYERTITAN R-KB2)
Absolute values:
L* :63.6 CIELAB units
a* :18.3 CIELAB units
b* :4.2 CIELAB units
Measurement of full shade
Absolute values:
L* :36.0 CIELAB units
a* :25.4 CIELAB units
b* :14.4 CIELAB units
Mn content: 0.037%, based on pigment
Cl content: 0.18 %, based on pigment
Cr content: 15 mg/kg, based on pigment Example 7

Calcination and Grinding of Iron Oxide Black Produced From $FeCl_2$ at 600° C.

100 g of an iron oxide black produced in accordance with Example 2 are heated to 600° C. over 141 minutes in a fused silica dish in a chamber furnace, passing through 600 l/h air, and then taken out of the furnace and cooled to ambient temperature.

The product obtained had the following properties:
Measurement of colour intensity (brightening with BAYERTITAN R-KB2)
Absolute values:
L* :61.5 CIELAB units
a* :28.1 CIELAB units
b* :21.2 CIELAB units
Measurement of full shade
Absolute values:
L* :42.5 CIELAB units
a* :29.4 CIELAB units
b* :22.9 CIELAB units
Mn content: 0.042%, based on pigment
Cl content: 0.35%, based on pigment
Cr content: 30 mg/kg, based on pigment
These properties were determined as stated above.

What is claimed is:

1. An iron oxide red pigment having:
    a) for full shade, a lightness, L*, of 36.0 to 44.0 CIELAB units, an a* value of 24 to 30 CIELAB units, and a b* value of 14 to 26 CIELAB units;
    b) with brigthening, a lightness, L*, of 59 to 66 CIELAB units, an a* value of 18 to 30 CIELAB units, and a b* value of 4 to 26 CIELAB units; and
    c) based on pigment, 0.012 to 0.12 wt % Mn, 0.05 to 0.59 wt % Cl and less than 40 mg Cr per kg pigment.

2. A process for producing iron oxide red pigment comprising,
    a) intensively admixing sufficient amounts of an alkaline component to an acidic 50–450 g/l $FeCl_2$ solution to adjust the pH of the solution to between 3 and 5;
    b) optionally adding a flocculation aid to the $FeCl_2$ solution in step a) before, after or concurrent with the addition of the alkaline component;
    c) optionally exposing the solution in steps a) or b) to oxidation;
    d) separating the solid resulting from steps a), b) or c) from the solution;
    e) adding the solution from step d) to an α- or β-FeOOH seed suspension produced by a precipitation process, in a quantity corresponding to 4 to 8 times the molar quantity of overall iron based on iron oxide hydroxide and unreacted iron compound in the seed suspension;
    f) heating the suspension formed in e) to 30 to 95° C. with thorough mixing;
    g) oxidizing the result of step f) by adding sufficient oxidizing agent to oxidize 0.5 to 10 mole % iron per hour while increasing the pH to a final pH of 3.0 to 5.0 by adding sufficient alkaline component to raise the pH at a rate of 0.01 to 0.4 pH units/hr;
    h) after step g), optionally continuing oxidation while maintaining the pH at a constant between 3.0 and 5.0;
    i) stopping the oxidation when the Fe(II) content of the suspension from step g) or h) is less than 1 mole %, thus producing a yellow pigment;
    j) separating off, washing, drying and grinding the yellow pigment from step i); and
    k) calcining the iron oxide yellow pigment at 350 to 1000° C. in the presence of oxygen-containing gas.

3. The process according to claim 2, wherein the temperature in step f) is 30 to 85° C.

4. The process according to claim 2, wherein the temperature in step f) is 55 to 75° C.

5. The process according to claim 2, wherein the rate of oxidation in step g) is 0.5 to 2.0 mole % per hour.

6. The process according to claim 2, wherein the temperature in step k) is 600 to 900° C.

7. The process according to claim 2, further comprising grinding the product of step k).

8. The process according to claim 2, wherein the alkaline component is selected from the group consisting of sodium hydroxide, sodium carbonate, magnesium carbonate, magnesium oxide, magnesium hydroxide, calcium oxide, calcium hydroxide and ammonia.

9. A process for producing iron oxide red pigment comprising
   a) intensively admixing sufficient amounts of an alkaline component to an acidic 50–450 g/l $FeCl_2$ solution to adjust the pH of the solution to between 3 and 5;
   b) optionally adding a flocculation aid to the $FeCl_2$ solution in step a) before, after or concurrent with the addition of the alkaline component;
   c) optionally exposing the solution in steps a) or b) to oxidation;
   d) separating the solid resulting from steps a), b) or c) from the solution;
   e) adding the solution from step d) to a solution which contains a precipitant at a temperature of 50 to 95° C., in a quantity such that the equivalent ratio of iron(II) to precipitant is 0.5 to 0.65;
   f) oxidizing the result of step e) by adding an oxidizing agent;
   g) stopping the oxidation when the Fe(II) content of the suspension from step f) is less than 1 mole %, thus producing a black pigment;
   h) separating off, washing and drying the black pigment from step g); and
   i) calcining the black pigment from step h) at 350 to 1000° C. in the presence of oxygen-containing gas.

10. The process according to claim 9, wherein the ratio in step e) is 0.5 to 0.58.

11. The process according to claim 9, wherein the temperature in step i) is 600 to 900° C.

12. The process according to claim 9, further comprising grinding the product of step i).

13. The process according to claim 9, wherein the alkaline component is selected from the group consisting of sodium hydroxide, sodium carbonate, magnesium carbonate, magnesium oxide, magnesium hydroxide, calcium oxide, calcium hydroxide and ammonia.

14. The process according to claim 9, wherein the precipitant is selected from the group consisting of sodium hydroxide, sodium carbonate, magnesium carbonate, magnesium oxide, magnesium hydroxide, calcium oxide, calcium hydroxide and ammonia.

15. An iron oxide red pigment according to claim 1 produced by the process comprising,
   a) intensively admixing sufficient amounts of an alkaline component to an acidic 50–450 g/l $FeCl_2$ solution to adjust the pH of the solution to between 3 and 5;
   b) optionally adding a flocculation aid to the $FeCl_2$ solution in step a) before, after or concurrent with the addition of the alkaline component;
   c) optionally exposing the solution in steps a) to b) to oxidation;
   d) separating the solid resulting from steps a), b) or c) from the solution;
   e) adding the solution from step d) to an α- or β-FeOOH seed suspension produced by a precipitation process, in a quantity corresponding to 4 to 8 times the molar quantity of overall iron based on iron oxide hydroxide and unreacted iron compound in the seed suspension;
   f) heating the suspension formed in e) to 30 to 95° C. with thorough mixing;
   g) oxidizing the result of step f) by adding sufficient oxidizing agent to oxidize 0.5 to 10 mole % iron per hour while increasing the pH to a final pH of 3.0 to 5.0 by adding sufficient alkaline component to raise the pH at a rate of 0.01 to 0.4 pH units/hr;
   h) after step g), optionally continuing oxidation while maintaining the pH at a constant between 3.0 and 5.0;
   i) stopping the oxidation when the Fe(II) content of the suspension from step g) or h) is less than 1 mole %, thus producing a yellow pigment;
   j) separating off, washing, drying and grinding the yellow pigment from step i); and
   k) calcining the yellow pigment at 350 to 1000° C. in the presence of oxygen-containing gas.

16. An iron oxide red pigment according to claim 1 produced by the process comprising,
   a) intensively admixing sufficient amounts of an alkaline component to an acidic 50–450 g/l $FeCl_2$ solution to adjust the pH of the solution to between 3 and 5;
   b) optionally adding a flocculation aid to the $FeCl_2$ solution in step a) before, after or concurrent with the addition of the alkaline component;
   c) optionally exposing the solution in steps a) or b) to oxidation;
   d) separating the solid resulting from steps a), b) or c) from the solution;
   e) adding the solution from step d) to a solution which contains a precipitant, at a temperature of 50 to 95° C., in a quantity such that the equivalent ratio of iron(II) to precipitant is 0.5 to 0.65;
   f) oxidizing the result of step e) by adding an oxidizing agent;
   g) stopping the oxidation when the Fe(II) content of the suspension from step f) is less than 1 mole %, thus producing a black pigment;
   h) separating off, washing and drying the black pigment from step g), and
   i) calcining the black pigment from step h) at 350 to 1000° C. in the presence of oxygen-containing gas.

17. A building material comprising the iron oxide red pigment according to claim 1.

18. A process to colour building material comprising adding the iron oxide red pigment according to claim 1 to the building material.

19. A paper or plastic material comprising the iron oxide red pigment according to claim 1.

20. A process to colour paper or plastic material comprising adding the iron oxide red pigment according to claims 1, 15 or 16 to the paper or plastic material.

21. A paint or lacquer comprising the iron oxide red pigment according to claim 1.

22. A process to colour paint or lacquer comprising adding the iron oxide red pigment according to claims 1, 15 or 16 to the paint or lacquer.

23. A colorant preparation comprising the iron oxide red pigment according to claim 1.

24. A process to produce a colorant preparation comprising adding the iron oxide red pigment according to claim 1 to the colorant preparation.

* * * * *